United States Patent Office 2,799,593
Patented July 16, 1957

2,799,593

JOINTING COMPOSITION

Raymond B. Seymour and Robert H. Steiner, Allentown, and Walter R. Pascoe, Reading, Pa., assignors to The Atlas Mineral Products Company of Pennsylvania, Mertztown, Pa., a corporation of Pennsylvania No Drawing. Application June 5, 1953,
Serial No. 359,974

6 Claims. (Cl. 106—287)

This invention relates to a jointing composition for use in joining pipe and, more particularly, relates to such a composition having sulfur as one of its principal ingredients.

Sulfur alone and together with a filler, such as pyrites, silica and carbon, is well known as a jointing composition. Such a jointing composition is unsatisfactory due principally to having a low tensile strength and no deflection resulting in ready cracking on a somewhat crystalline pattern.

Various attempts have been made to improve the characteristics of sulfur jointing compositions through the use of plasticizers. Although improvement has resulted, a composition having satisfactory heat stability, the capacity to retain its properties on long standing, ductility, flexibility, strength with freedom from cracking and unpleasant odor has not heretofore been achieved.

In accordance with this invention, it has been found that the addition of a disulfide to sulfur alone or with a filler produces a highly superior jointing composition which retains its effectiveness after long standing.

More specifically, the disulfide may be, for example, an alkyl disulfide of from 8 to 14 carbon atoms, such as dodecyl disulfide, nonyl disulfide and octyl disulfide; a mono-, di- or tri-alkylene disulfide of from 8 to 14 carbon atoms, such as triisobutylene disulfide, diisobutylene disulfide and octene disulfide; benzothiazyl disulfide or a tetra lower alkyl thiuram disulfide, such as tetramethylthiuram disulfide, tetraethylthiuram disulfide, tetrabutylthiuram disulfide and tetraamylthiuram disulfide. The disulfide will be present in an amount of from 0.2% to 15% by weight of the sulfur.

Conventionally used inert fillers, such as graded silica, asbestos, carbon and slate flour can be added to the sulfur-disulfide composition as desired.

The disulfides used ni this invention are well known to the art and are readily obtained by the oxidation of the corresponding mercaptans. Thus, for example, 2 mercaptobenzothiazole can be oxidized with chlorine to form benzothiazyl disulfide and dodecyl mercaptan similarly can be oxidized with chlorine or iodine to produce dodecyl disulfide. If desired, the desired disulfide can be formed in situ in the sulfur by adding the corresponding mercaptan to the sulfur and heating. It is, however, preferred to prepare the disulfide separately. Where formed separately, the disulfide is added to molten sulfur while stirring.

The composition of this invention will be further clarified by the following examples:

*Example 1*

| | Pounds |
|---|---|
| Sulfur | 95 |
| Benzothiazyl disulfide | 5 |

*Example 2*

| | |
|---|---|
| Sulfur | 90 |
| Benzothiazyl disulfide | 10 |

*Example 3*

| | |
|---|---|
| Sulfur | 95 |
| Dodecyl disulfide | 5 |

*Example 4*

| | |
|---|---|
| Sulfur | 90 |
| Dodecyl disulfide | 10 |

*Example 5*

| | |
|---|---|
| Sulfur | 59.2 |
| Finely divided silica | 37.7 |
| Carbon powder | 1.8 |
| Benzothiazyl disulfide | 1.3 |

*Example 6*

| | |
|---|---|
| Sulfur | 59.2 |
| Finely divided silica | 37.7 |
| Carbon powder | 1.8 |
| Dodecyl disulfide | 1.3 |

*Example 7*

| | |
|---|---|
| Sulfur | 59.2 |
| Finely divided silica | 37.7 |
| Carbon powder | 1.8 |
| Triisobutylene disulfide | 1.3 |

*Example 8*

| | |
|---|---|
| Sulfur | 60.2 |
| Finely divided silica | 37.7 |
| Carbon flour | 1.8 |
| Benzothiazyl disulfide | .3 |

*Example 9*

| | |
|---|---|
| Sulfur | 60.2 |
| Finely divided silica | 37.7 |
| Carbon flour | 1.8 |
| Dodecyl disulfide | .3 |

*Example 10*

| | |
|---|---|
| Sulfur | 55.5 |
| Finely divided silica | 37.7 |
| Carbon flour | 1.8 |
| Benzothiazyl disulfide | 5.0 |

*Example 11*

| | |
|---|---|
| Sulfur | 50.5 |
| Finely divided silica | 37.7 |
| Carbon flour | 1.8 |
| Benzothiazyl disulfide | 10.0 |

*Example 12*

| | |
|---|---|
| Sulfur | 45.5 |
| Finely divided silica | 37.7 |
| Carbon flour | 1.8 |
| Benzothiazyl disulfide | 15.0 |

*Example 13*

| | |
|---|---|
| Sulfur | 65.0 |
| Carbon flour | 30.0 |
| Benzothiazyl disulfide | 5.0 |

*Example 14*

| | |
|---|---|
| Sulfur | 65.0 |
| Carbon flour | 30.0 |
| Dodecyl disulfide | 5.0 |

*Example 15*

| | |
|---|---|
| Sulfur | 59.2 |
| Finely divided silica | 37.7 |
| Carbon flour | 1.8 |
| Diisobutylene disulfide | 1.3 |

*Example 16*

| | |
|---|---|
| Sulfur | 59.2 |
| Finely divided silica | 37.7 |
| Carbon powder | 1.8 |
| Tetramethylthiuram disulfide | 1.3 |

It is not desired to be limited except as set forth in

What is claimed is:

1. A jointing composition consisting essentially of sulfur, a filler, and a disulfide selected from the group consisting of alkyl disulfides having from 8 to 14 carbon atoms; alkylene disulfides having from 8 to 14 carbon atoms; and benzothiazyl disulfide; the disulfide being present in an amount of from .2% to 15% by weight of the sulfur and intimately mixed with the sulfur.

2. A composition in accordance with claim 1, characterized by the fact that the disulfide is benzothiazyl disulfide.

3. A composition in accordance with claim 1, characterized by the fact that the disulfide is dodecyl disulfide.

4. A composition in accordance with claim 1, characterized by the fact that the disulfide is triisobutylene disulfide.

5. A composition in accordance with claim 1, characterized by the fact that the disulfide is diisobutylene disulfide.

6. A composition in accordance with claim 1, characterized by the fact that the disulfide is tetra lower alkyl thiuram disulfide.

References Cited in the file of this patent

UNITED STATES PATENTS

| | | |
|---|---|---|
| 2,006,057 | Northam | June 23, 1935 |
| 2,014,353 | Cramer | Sept. 10, 1935 |
| 2,061,019 | Carter | Nov. 17, 1936 |
| 2,237,627 | Olin | Apr. 8, 1941 |
| 2,310,449 | Lightbown | Feb. 9, 1943 |